March 2, 1948. W. F. LONGFIELD 2,436,968
COMBINED CLUTCH AND BRAKE
Filed July 31, 1945 2 Sheets-Sheet 1

INVENTOR
WILLIAM F. LONGFIELD
BY Chas. H. Trotter
ATTORNEY

March 2, 1948.  W. F. LONGFIELD  2,436,968
COMBINED CLUTCH AND BRAKE
Filed July 31, 1945  2 Sheets-Sheet 2

INVENTOR
WILLIAM F. LONGFIELD
BY Chas. H. Trotter
ATTORNEY

Patented Mar. 2, 1948

2,436,968

UNITED STATES PATENT OFFICE 2,436,968

COMBINED CLUTCH AND BRAKE

William F. Longfield, Cleveland, Ohio, assignor to The Cleveland Punch & Shear Works Company, Cleveland, Ohio, a corporation of Ohio Application July 31, 1945, Serial No. 607,990

5 Claims. (Cl. 192—18)

This invention relates to combined clutches and brakes of the friction disc type such as are extensively used to control the operation of various different types of machine tools and are especially adapted for use on large sheet metal working presses.

The invention comprises generally a friction disc clutch thru which a constantly rotating flywheel rotatably mounted on a drive shaft is connected to and disconnected from said shaft and a friction disc brake thru which the rotation of the drive shaft is stopped and held when the clutch is disengaged. The clutch and brake are mounted adjacent each other and are interconnected in such a manner that the brake is released as the clutch is engaged and applied as the clutch is disengaged. Fluid pressure means are provided for engaging the clutch and releasing the brake and spring means are provided for disengaging the clutch and applying the brake when the fluid pressure means is rendered inoperative.

Broadly, devices of this character are old in the art. My invention as shown and described herein relates to the specific construction of such a device.

The principal object of the invention is to provide a device of this character which is simple and compact; which is easy to manufacture and assemble and which will give long uninterrupted service without adjustment or repair.

The preferred embodiment of the invention is disclosed in the following specification and the accompanying drawings forming a part thereof wherein.

Figure 1:
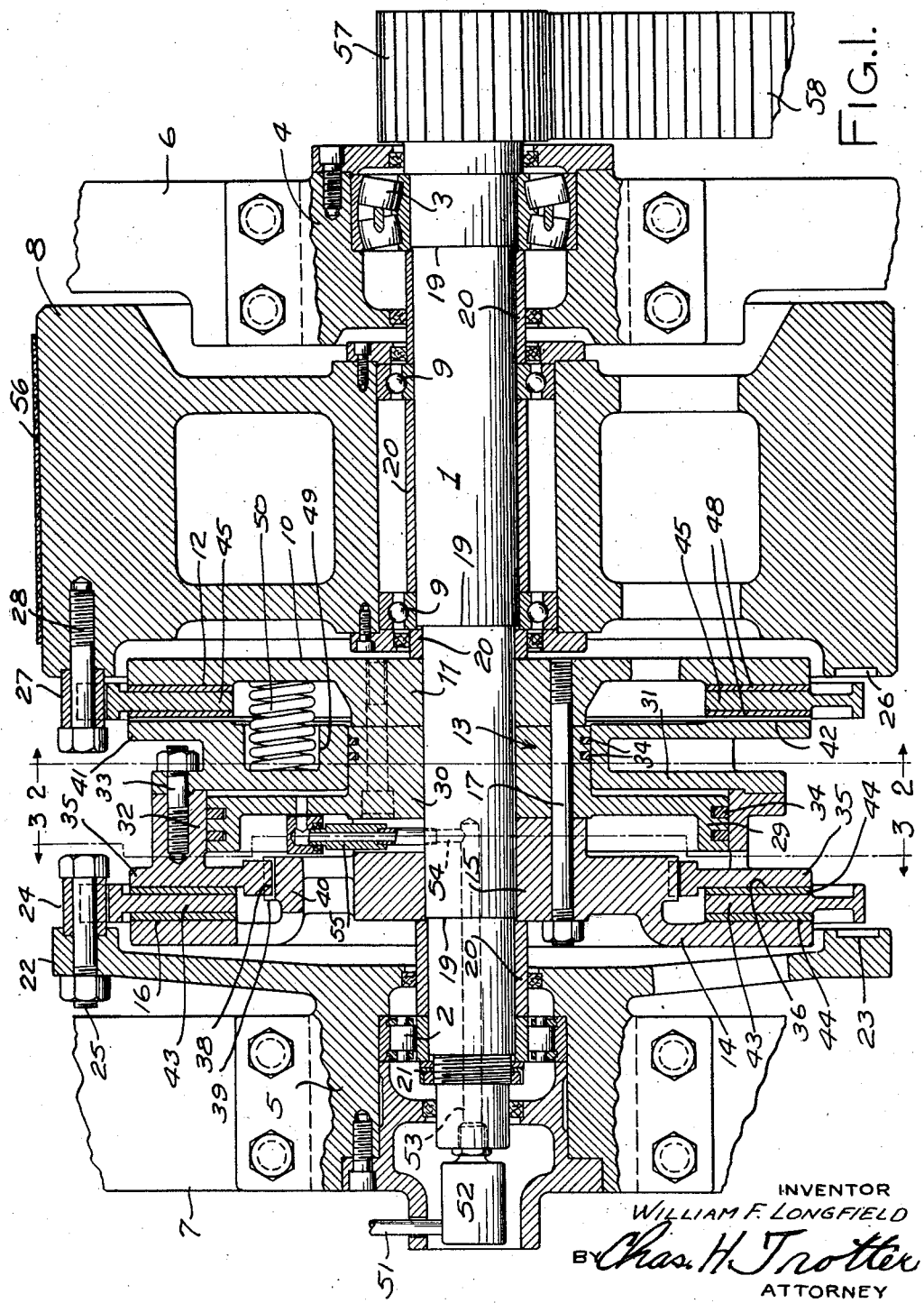
Fig. 1 is a central longitudinal section thru a combined clutch and brake constructed according to my invention, the plane of the section being indicated by the line 1—1 of Fig. 2.

Referring to the drawings by reference characters the numeral 1 indicates a drive shaft which is rotatably supported by roller bearings 2 and 3 mounted in brackets 4 and 5 which are bolted to suitable supports 6 and 7 of a metal working press.

A flywheel 8 is rotatably supported on the shaft 1 adjacent the support 6 and bracket 4 by ball bearings 9. A plate 10 having a hub 11 and an annular friction surface 12 is mounted on the shaft 1 to the left of and in close proximity to the flywheel 8 as viewed in Fig. 2. Next to the plate 10 upon the shaft 1 is mounted a piston assembly generally indicated by the numeral 13, and next to the piston assembly 13 upon the shaft 1 is mounted a second plate 14. The plate 14 has a hub 15, and an annular friction surface 16 facing the friction surface 12 of the plate 10. The plates 10 and 14 and the piston assembly 13 are all bolted together by bolts 17 so as to form in effect a unitary structure which is keyed to the shaft 1 by keys 18 so as to always rotate therewith. The shaft 1 and the various parts mounted thereon are all held in their proper positions with respect to each other and the brackets 4 and 5 by suitable shoulders 19 formed on the shaft 1, spacer sleeves 20 interposed between the various members as shown, and by the nut 21. Suitable grease retainers are provided for the bearings 2, 3 and 9.

Figure 3:
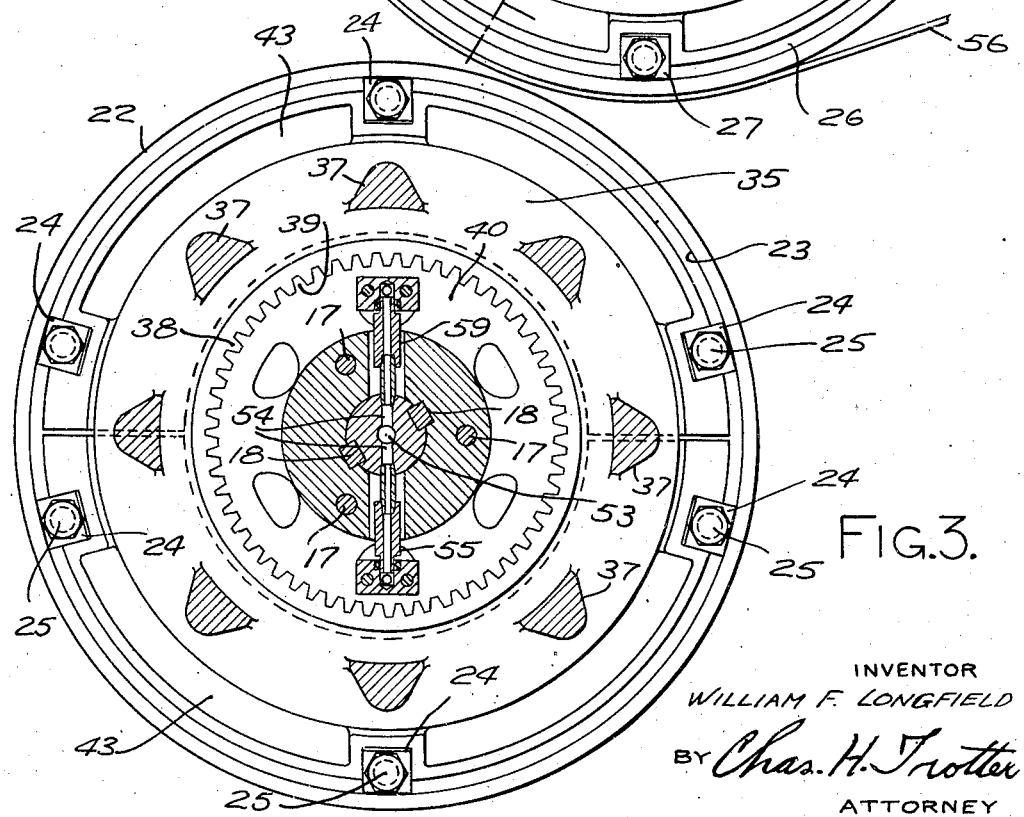
Fig. 3 is a transverse section taken on the line 3—3 of Fig. 1.

The bracket 5 has an annulus 22 rigidly secured thereto, or cast integrally therewith as shown in Fig. 1. The inner face of the annulus 22 has a circular groove 23 formed therein near the periphery thereof. A plurality of spaced blocks 24, six being shown in Fig. 3, are inserted into the groove 23 and are bolted to the annulus 22 by bolts 25. The blocks 24 are of such a size that they fit snugly into the groove 23 and are prevented from turning on the bolts 25 by engagement with the side walls of the groove 23.

Figure 2:
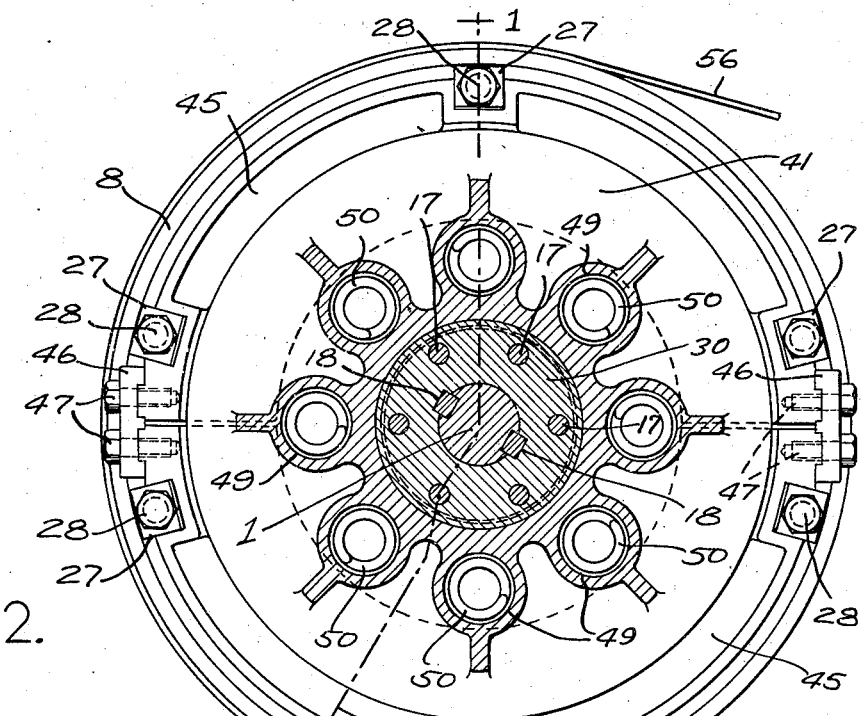
Fig. 2 is a transverse section taken on the line 2—2 of Fig. 1.

A circular groove 26 similar to the groove 23 is formed in the inner face of the flywheel 8. A plurality of blocks 27, six being shown in Fig. 2, are inserted in the groove 27 and are rigidly secured to the flywheel by bolts 28. The blocks 27, which are similar to the blocks 24, fit snugly in the groove 26 and are prevented from turning upon the bolts 28 by engagement with the side walls of the groove 26.

The piston assembly 13 comprises a piston 29 and a hub 30 which projects from the head of the piston towards and into engagement with the hub 11 of the plate 10. The hub 30 has a smooth cylindrical outer surface upon which is slidably mounted the head 31 of a cylinder 32 which is slidably mounted upon the piston 29. The cylinder head 31 is bolted to the cylinder 32 by bolts 33. Rings 34, which are mounted in suitable grooves in the piston 29 and hub 30, prevent the escape of fluid from within the cylinder 32.

A plate 35 having a smooth friction surface 36 is rigidly connected to the cylinder 32 by spacers 37 which are cast integrally with the cylinder 32 and plate 35. The plate 35 has a central bore therethru which is internally toothed as indicated at 38. The teeth 38 slidably engage teeth 39 cut in the periphery of an annular extension 40 of the hub 15. A plate 41 having a smooth friction surface 42 is cast integrally with the cylinder head 31.

From the foregoing it will be apparent that the plates 10, 14, 35 and 41, the piston assembly 13, the cylinder 32 and the cylinder head 31 will all rotate in union with each other and the shaft 1; and that the cylinder 32, cylinder head 31 and the plates 35 and 41 may move longitudinally between the plates 10 and 14. Also it will be seen that if the cylinder 32 and cylinder head 31 are rotated, the shaft 1 will be rotated and conversely if the cylinder and cylinder head are constrained from rotating the shaft 1 will likewise be constrained.

A brake ring 43 is disposed between the plates 14 and 35. This ring which is made up of two semi-circular sections is slidably mounted upon the blocks 24 and has a suitable friction material 44 applied to its two faces.

A clutch ring 45, similar to the brake ring 43, is disposed between the plates 10 and 41. This clutch ring which is made up of two semi-circular sections fastened together by blocks 46 and bolts 47 is slidably mounted upon the blocks 27 so that it will rotate with the flywheel 8. If desired, suitable friction material 48 may be applied to the faces of the ring 45.

The cylinder head 31 has a plurality of cup shaped recesses 49 formed therein. A compression spring 50 is seated in each of the recesses 49. These springs 50 are interposed between the cylinder head 31 and the plate 10, one end of each of the springs bearing against the cylinder head and the other end of the spring bearing against the plate 10, so that they normally bias the longitudinally slidable parts to the position shown in Fig. 1, to apply the brake and release the clutch. In this position the brake ring 43 is tightly clamped between the plates 14 and 35, and the clutch ring 45 hangs loosely between the plates 10 and 41. The brake ring 43, as previously described, is non-rotatably connected to the annulus 22 by means of the blocks 24 and bolts 25. Hence it follows that when the plate 14, which is rigidly connected to the drive shaft 1, is kept from rotating by being clamped against the non-rotatable ring 43, the drive shaft 1 and all the parts operatively connected thereto will also be held stationary.

To release the brake and engage the clutch fluid under pressure is forced into the cylinder 32 between the piston head 29a and the cylinder head 31. This will move the cylinder 32, the cylinder head 31, and the plates 35 and 41 connected to the cylinder and cylinder head to the right, as the parts are viewed in Fig. 1, which compresses the springs 50, disengages the plates 14 and 35 and the brake ring 43, and clamps the clutch ring 45 tightly between the plates 10 and 41. The drive shaft 1 and all the parts operatively connected thereto will then be driven by the constantly rotating flywheel thru the clutch ring 45 which is mounted to rotate with the flywheel.

Fluid, air or oil under pressure is admitted to the cylinder 32 from any suitable source of supply, not shown, thru pipe 51, coupling 52, longitudinal bore 53 in the shaft 1, transverse bores 54 in the shaft 1 and connection 55 between the bores 54 and the cylinder 32.

The admission of the fluid to the cylinder 32 to release the brake and engage the clutch may be controlled either manually or automatically as desired. The general practice today is to control the flow of this fluid by means of an electrically operated 3-way valve. A manually operated switch when closed causes the 3-way valve to move to a position to admit fluid to the cylinder and an automatically operated switch which is closed at a predetermined time by a movable part of the machine to which the clutch and brake is applied causes the 3-way valve to move to a position to exhaust the fluid from the cylinder. The springs 50 will then force the cylinder 32, cylinder head 31 and the plates 35 and 41 to the position shown in Fig. 1, disengaging the clutch and applying the brake.

In operation the flywheel 8 is constantly driven from any suitable source of power thru a belt 56, and the press or other mechanism to which the clutch and brake may be applied is operated by the shaft 1 thru a pinion gear 57 secured to the shaft 1 and a gear train generally indicated by the numeral 58.

From the foregoing it will be apparent to those skilled in this art that I have provided a very simple, compact, and efficient combined clutch and brake which will accomplish the objects of the invention.

It is to be understood that I am not limited to the specific embodiment of my invention shown and described herein as various changes may be made thereto which are within the scope of the appended claims.

Having thus described my invention, I claim:

1. In a device of the character described the combination of a rotatably supported shaft, a flywheel rotatably mounted upon said shaft, a stationary support spaced from said flywheel, a hub rigidly secured to said shaft between said flywheel and said stationary support, a clutch plate formed integrally with one end of said hub, a brake plate formed integrally with the other end of said hub, a piston formed integrally with said hub intermedaite said clutch plate and said brake plate, a cylinder slidably but non-rotatably mounted upon said piston, a clutch clamping plate rigidly secured to one end of said cylinder, a brake clamping plate rigidly secured to the other end of said cylinder, a clutch ring disposed between said clutch plate and said clutch clamping plate and connected to said flywheel for rotation therewith, a brake ring disposed between said brake plate and said brake clamping plate, and non-rotatably secured to said stationary support, spring means operative to clamp said brake ring between said brake plate and said brake clamping plate, and fluid pressure means operative to clamp said clutch ring between said clutch plate and said clutch clamping plate.

2. In a device of the character described, the combination of a pair of spaced fixed brackets, a shaft rotatably supported by said brackets, a flywheel rotatably mounted upon said shaft adjacent one of said brackets, an annular flange rigidly secured to the other of said brackets, a hub rigidly secured to said shaft between said flywheel and said flange, a clutch plate formed integrally with one end of said hub, a brake plate formed integrally with the other end of said hub, a piston formed integrally with said hub intermediate said clutch plate and said brake plate, a cylinder slidably but non-rotatably mounted upon said piston, a clutch clamping plate rigidly secured to one end of said cylinder, a brake clamping plate rigidly secured to the other end of said cylinder, a clutch ring disposed between said clutch plate and said clutch clamping plate and connected to said flywheel for rotation therewith, a brake ring disposed between said brake plate and said brake clamping plate, and non-rotatably secured to said annular flange, spring means operative to clamp said brake ring between said brake plate and said brake clamping plate, and fluid pressure means operative to clamp said clutch ring between said clutch plate and said clutch clamping plate.

3. In a device of the character described the combination of a rotatably supported shaft, a flywheel rotatably mounted upon said shaft, stationary support spaced from said flywheel, a hub rigidly secured to said shaft between said flywheel and said stationary support, a clutch plate formed integrally with one end of said hub, a brake plate formed integrally with the other end of said hub, teeth on said hub adjacent said brake plate, a piston formed integrally with said hub intermediate said clutch plate and said brake plate, a cylinder slidably mounted on said piston, a clutch clamping plate rigidly secured to one end of said cylinder, a ring shaped brake clamping plate rigidly secured to the other end of said cylinder, teeth formed in the inner peripheral edge of said ring shape brake clamping plate, said teeth meshing with the said teeth on said hub, a clutch ring disposed between said clutch plate and said clutch clamping plate and connected to said flywheel for rotation therewith, a brake ring disposed between said brake plate and said brake clamping plate and non-rotatably secured to said stationary support, spring means operative to clamp said brake ring between said brake plate and said brake clamping plate, and fluid pressure means operative to clamp said clutch ring between said clutch plate and said clutch clamping plate.

4. In a device of the character described the combination of a rotatably supported shaft, a flywheel rotatably mounted upon said shaft, stationary support spaced from said flywheel, a hub rigidly secured to said shaft between said flywheel and said stationary support, a clutch plate formed integrally with one end of said hub, a brake plate formed integrally with the other end of said hub, teeth on said hub adjacent said brake plate, a piston formed integrally with said hub intermediate said clutch plate and said brake plate, a cylinder slidably mounted on said piston, a cylinder head bolted to one end of said cylinder and slidably mounted on said hub between said piston and said clutch plate, a clutch clamping ring rigidly secured to said cylinder head, a ring shaped brake clamping plate rigidly secured to the other end of said cylinder, teeth formed in the inner peripheral edge of said ring shaped brake clamping plate, said teeth meshing with the said teeth on said hub, a clutch ring disposed between said clutch plate and said clutch clamping plate and connected to said flywheel for rotation therewith, a brake ring disposed between said brake plate and said brake clamping plate and non-rotatably secured to said stationary support, spring means disposed between said cylinder head and said clutch plate and operative to clamp said brake ring between said brake plate and said brake clamping plate, and fluid pressure means operative to move said cylinder against the pressure of said spring means to clamp said clutch ring between said clutch plate and said clutch clamping plate.

5. In a device of the character described, the combination of a pair of spaced fixed brackets, a shaft rotatably supported by said brackets, a flywheel rotatably mounted upon said shaft adjacent one of said brackets, an annular flange rigidly secured to the other of said brackets, a hub rigidly secured to said shaft between said flywheel and said flange, a clutch plate formed integrally with one end of said hub, a brake plate formed integrally with the other end of said hub, teeth on said hub adjacent said brake plate, a piston formed integrally with said hub intermediate said clutch plate and said brake plate, a cylinder slidably mounted on said piston, a cylinder head bolted to one end of said cylinder and slidably mounted on said hub between said piston and said clutch plate, a clutch clamping ring rigidly secured to said cylinder head, a ring shaped brake clamping plate rigidly secured to the other end of said cylinder, teeth formed in the inner peripheral edge of said ring shaped brake clamping plate, said teeth meshing with the said teeth on said hub, a clutch ring disposed between said clutch plate and said clutch clamping plate and connected to said flywheel for rotation therewith, a brake ring disposed between said brake plate and said brake clamping plate and non-rotatably secured to said annular flange, spring means disposed between said cylinder head and said clutch plate and operative to clamp said brake ring between said brake plate and said brake clamping plate, and fluid pressure means operative to move said cylinder against the pressure of said spring means to clamp said clutch ring between said clutch plate and said clutch clamping plate.

WILLIAM F. LONGFIELD.

REFERENCES CITED

The following references are of record in the file of this patent:

UNITED STATES PATENTS

| Number | Name | Date |
| --- | --- | --- |
| 2,159,326 | Harwood et al. | May 23, 1939 |

FOREIGN PATENTS

| Number | Country | Date |
| --- | --- | --- |
| 114,870 | Australia | June 21, 1941 |